(12) United States Patent
Mele

(10) Patent No.: US 11,912,957 B2
(45) Date of Patent: Feb. 27, 2024

(54) METHOD AND AN APPARATUS FOR PREPARING A HIGH-POLYPHENOLS OLIVE OIL

(71) Applicant: LEVIUS VITA FOODS S.R.L., Montecatini Terme (IT)

(72) Inventor: Antonio Mele, Montecatini Terme (IT)

(73) Assignee: LEVIUS VITA FOODS S.R.L., Montecatini Terme (IT)

( * ) Notice: Subject to any disclaimer, the term of this patent is extended or adjusted under 35 U.S.C. 154(b) by 1079 days.

(21) Appl. No.: 16/497,491

(22) PCT Filed: Apr. 16, 2018

(86) PCT No.: PCT/IB2018/052628
§ 371 (c)(1),
(2) Date: Sep. 25, 2019

(87) PCT Pub. No.: WO2018/189730
PCT Pub. Date: Oct. 18, 2018

(65) Prior Publication Data
US 2021/0108152 A1 Apr. 15, 2021

(30) Foreign Application Priority Data
Apr. 14, 2017 (IT) ............. 10 20170 00042090

(51) Int. Cl.
*C11B 1/10* (2006.01)
*A23D 7/005* (2006.01)
(Continued)

(52) U.S. Cl.
CPC ............ *C11B 1/108* (2013.01); *A23D 7/0053* (2013.01); *A23D 9/007* (2013.01); *C11B 1/04* (2013.01); *C11B 1/06* (2013.01); *C11B 3/008* (2013.01)

(58) Field of Classification Search
CPC ... C11B 1/108; C11B 1/04; C11B 1/06; C11B 3/008; C11B 1/02; C11B 3/006; A23D 7/0053; A23D 9/007
See application file for complete search history.

(56) References Cited

U.S. PATENT DOCUMENTS

2003/0207007 A1   11/2003   Maitland et al.
2004/0176647 A1    9/2004   Perdices et al.
(Continued)

FOREIGN PATENT DOCUMENTS

EP   2 044 848 A1    4/2009
EP   2044848 A1 *    4/2009   ............... C02F 9/00
(Continued)

OTHER PUBLICATIONS

International Search Report, dated Jul. 5, 2018, corresponding to International Application No. PCT/IB2018/052628.

*Primary Examiner* — Deborah D Carr
(74) *Attorney, Agent, or Firm* — LADAS & PARRY LLP; Malcolm J. MacDonald, Esq.

(57) ABSTRACT

A process for making olive oil having a high polyphenol content and, in particular a high hydroxytyrosol content, comprises the conventional steps of transforming (II) olives (1) into an oily must (5); of resolving (V) the later into an oily juice (7), from which a base olive oil (8) is obtained, and into an aqueous juice (6) containing most of the polyphenols; and of separating (VII) the vegetation water (9) from the aqueous juice (6). Moreover, according to the invention, steps are provided of removing water (XV) from the vegetation water (9), preferably by evaporation, so as to obtain a polyphenol-enriched concentrate (11); and of mixing (XIX) the concentrate (11) with the base olive oil (8), so as to transfer said polyphenols from the former to the latter and to obtain a final polyphenol-enriched oil (12), along with an exhausted concentrate (11'). The step of removing water (Continued)

causes a polyphenol concentration increase, to enhance their interphase transfer, and, at the same time, it causes a viscosity and density increase, which makes the water phase, during the contact with the oil, less prone to form emulsions than the methods of prior art. The high polyphenol concentration remarkably improves the organoleptic quality of the oil and makes the latter more stable, besides producing well-known advantageous effects for the consumer's health. According to further aspects of the invention, an apparatus is provided for making such oils, as well as a concentrate for use in olive oils and also in any other vegetable or animal food oil, in cosmetics, bio-repellent products and the like.

25 Claims, 5 Drawing Sheets

(51) Int. Cl.
*A23D 9/007* (2006.01)
*C11B 1/04* (2006.01)
*C11B 1/06* (2006.01)
*C11B 3/00* (2006.01)

(56) References Cited

U.S. PATENT DOCUMENTS

| | | |
|---|---|---|
| 2012/0302515 A1 | 11/2012 | Germani et al. |
| 2013/0309300 A1 | 11/2013 | Mas et al. |
| 2016/0250272 A1 | 9/2016 | Lo Franco et al. |
| 2016/0256507 A1 | 9/2016 | Lo Franco et al. |

FOREIGN PATENT DOCUMENTS

| | | | |
|---|---|---|---|
| JP | 2009-291107 A | 12/2009 | |
| JP | 2009291107 A * | 12/2009 | |
| WO | 2005/046358 A1 | 5/2005 | |
| WO | 2007/105969 A1 | 9/2007 | |
| WO | 2008/142178 A1 | 11/2008 | |
| WO | WO-2012011883 A1 * | 1/2012 | ............... B30B 9/02 |
| WO | 2016/087428 A1 | 6/2016 | |

* cited by examiner

METHOD AND AN APPARATUS FOR PREPARING A HIGH-POLYPHENOLS OLIVE OIL

FIELD OF THE INVENTION

The present invention relates to the processes of treatment and mechanical transformation of the olives, in order to obtain virgin olive oil. More in detail, the invention relates to a method and to apparatuses that allow obtaining polyphenol-rich virgin olive oil, more in particular, an oil containing a large amount of free hydroxytyrosol, also known as 1-(2-hydroxyethyl)-3,4-dihydroxybenzene or 3,4-dihydroxyphenylethanol (3,4-DHPEA).

Polyphenols, in particular hydroxytyrosol, give stability to the oil. More in detail, they contribute to maintain the organoleptic and nutritional quality of the virgin olive oil, besides having advantageous effects on human health. The antioxidant effect of polyphenols allows therefore a longer shelf-life, which makes the oil commercially more competitive.

STATE OF THE ART

The European Food Safety Authority (EFSA) has recognized that total hydroxytyrosol, i.e. the compound as such and its derivatives, prevents the oxidation of low density lipoproteins (LDL), which has well-known beneficial effects on the oil consumers' cardiovascular health, provided a balanced diet is followed. In this connection, according to EFSA, a virgin olive oil should be allowed to expose a health declaration in a label only if it contains such an amount of hydroxytyrosol and derivatives that a daily oil consumption of about 20 grams corresponds to at least 5 mg daily hydroxytyrosol intake. This object is not easy to achieve by any extra-virgin olive oils. In fact, also extra-virgin olive oils that contain such a hydroxytyrosol and derivatives amount when they are produced, can hardly maintain it for more than 6-8 months.

A few extra-virgin olive oils obtained by the conventional production processes, for example those obtained from Coratina olives show very high polyphenol levels that could respect the requirements allowing the above-mentioned declaration, for even 8 to 12 months. However, these oils usually have a bitter taste, which is not always appreciated by the consumers. For instance, Coratina oil, as well as other high polyphenol oils, has a low commercial value.

Hydroxytyrosol is not as bitter as oleuropein, from which it derives. Therefore, a virgin olive oil polyphenol enrichment obtained by increasing the hydroxytyrosol amount contained therein is an object highly desired by the market.

The need is therefore felt of making an extra-virgin olive oil containing a much higher polyphenol amount than the amount presently achieved, without adversely affecting the organoleptic quality of the final oil.

The virgin olive oil mechanical extraction processes are normally carried out in oil mills, and can be batch or continuous processes. In both cases, these methods basically provide two steps:
  crushing the olives, from which an oily must is obtained, which contains pit fragments, a destructured pulp and a mixed liquid phase comprising oil and vegetation water;
  resolving the must, from which oil is obtained along with a waste containing water, pulp residues and pit fragments.

More recently, some oil mills have been constructed in such a way to allow:
  a control the amount of volatile compounds, which determines the oil flavour;
  a control of the concentration of some compounds imparting stability to the oil, among which the biophenols (polyphenols), which turned out to be important for both the consumer's health, according to EFSA's advice, and the virgin olive oil quality and stability;
  to overcome the limitation due to the discontinuous nature of malaxation step, as performed in the traditional oil mills, and to obtain a true continuous process, in order to improve the absolute production yield, the production rate, as well as the quality of the oil.

Even if the accurate control of such process parameters as the temperature, the time, the process water amount, and the presence of oxygen, makes it possible to optimally exploit the enzyme pool mainly affecting the volatile components and the presence of polyphenol, the attained amount of polyphenols that is found in the commercially available oils does not exceed a few tens of ppm and the hydroxytyrosol amount does not exceed a few ppm.

In WO2016087428A1 a process is described of fortifying edible oil with hydroxytyrosol. The process provides forming an aqueous solution by adding to water more than 5% by weight of hydroxytyrosol, heating the aqueous solution between 25° C. and 95° C. and mixing the edible oil with said aqueous solution to form a two-phase mixture, and eventually separating the fortified edible oil as an oil phase from the two-phase mixture. The fortified edible oil can comprise more than 250 mg/kg of hydroxytyrosol. WO2016087428A1 discloses that hydroxytyrosol can be obtained from pomace, i.e. the water phase resulting from the olive oil production process, in particular from the vegetation water. However, hydroxytyrosol is separated from the vegetation water by an extraction method that can use water or organic solvents or chromatography.

However, these extraction methods are expensive and show a low transfer efficiency to cause the predetermined amount of hydroxytyrosol to be transferred into the oil food, unless a very high hydroxytyrosol concentration is attained.

JP 2009291107 A describes a method for making a high polyphenol concentration olive oil by dissolving a water-soluble component derived from olive fruit into olive oil. The water-soluble component can be a solid phase portion obtained by adding compressing olive fruits, or from pomace extracted with water and/or alcohols, or from vegetation water. In the latter case, the water-soluble component is obtained by adding such a solvent as ethanol to vegetation water, so as to form a solid precipitate that is then removed by cold centrifugation, while the supernatant is further filtered and only at this time concentrated or even dry solidified to yield the water-soluble component.

US 2012/302515A describes methods for making phytoextracts suitable for use in the food, cosmetic, and phytotherapeutic industries, from vegetation waters and pomaces coming from olive milling. The methods are based on combining physical-chemical and enzymatic pre-treatment methods, membrane tangential filtration and vacuum evaporation.

SUMMARY OF THE INVENTION

It is therefore a feature of the present invention to provide an oil mill process to obtain a virgin olive oil containing more than 300 ppm polyphenols, in particular containing more than 10 ppm free hydroxytyrosol (1-(2-hydroxyethyl)-

3,4-dihydroxybenzene or 3,4-dihydroxyphenylethanol), without adversely affecting the taste of the final oil.

It is a particular feature of the invention to provide such a process that makes it possible to obtain a virgin oil polyphenol content set between 300 and 700 ppm.

It is another particular feature of the invention to provide such a process that makes it possible to obtain a free hydroxytyrosol content set between 40 and 120 ppm.

It is another feature of the invention to provide a plant, i.e. an apparatus for carrying out said process.

According to another aspect, it is also a feature of the invention to provide a polyphenol-rich concentrated composition that can be used for increasing the polyphenol content in both olive oils, even well after their production in an oil mill, for example after one month, and vegetable oils or oils obtained from fishes and, more generally, from animals.

It is also a feature of the invention to provide such a polyphenol-based composition for making dietary supplements for human and animal use, cosmetics and bio-repellents.

It is also a feature of the invention to provide such a polyphenol-based composition for treating skin diseases, in particular for psoriasis and acne vulgaris.

These and other objects are achieved by a process for making an olive oil containing more than 300 ppm polyphenols, preferably containing between 300 and 700 ppm polyphenols, and containing more than 10 ppm hydroxytyrosol, preferably containing between 40 and 120 ppm hydroxytyrosol, said process comprising the steps of:
  prearranging an amount of olives to be treated;
  transforming the olives into an oily must;
  resolving the oily must into:
    an oily juice;
    an aqueous juice, the aqueous juice containing polyphenols;
  preparing a base olive oil from the oily juice;
  separating vegetation water from the aqueous juice,
characterized in that it also comprises the steps of:
  removing water from the vegetation water obtaining a polyphenol-enriched concentrate;
  discontinuing the step of removing water when the vegetation water while turning into the concentrate achieves a predetermined viscosity and/or density;
  mixing the base olive oil with the concentrate in order to cause a transfer of polyphenols from the concentrate into the base olive oil obtaining a polyphenol-enriched final oil as well as an exhausted concentrate which is separated from said polyphenol-enriched final oil.

The concentrate to be used for increasing the polyphenol content in a base oil is obtained by progressively removing water from vegetation water. The latter, as well known, contains a predetermined solute amount, typically macromolecules such as carbohydrates, nitrogen-containing substances, polyalcohols; fats; organic acids and mineral compounds, which are found in the permeate phase of the step of separating an olive residue from the aqueous juice, as well as other dense components in the form of molecules having a molecular weight higher than the molecules of the mixture of polyphenols and macromolecules. The water-removal step increases the polyphenols concentration, which enhances the potential for interphase transfer of polyphenol from the concentrate into the oil during the subsequent step of mixing the base olive oil with the concentrate. At the same time, the water removal also increases the concentration of such solutes and, accordingly, it causes the concentrate density and viscosity to increase in a short time, and up to a value depending upon the amount of removed water. The water removal is discontinued when the concentrate achieves a predetermined viscosity and/or density.

This enables a polyphenol transfer-effective contact between the concentrate and the virgin olive oil (or any other food or cosmetic oil) to transfer the polyphenols from the concentrate to the oil, due to the high polyphenol concentration difference between the two phases, such concentration being 100 to 600 times higher in the concentrate than in the oil phase.

Moreover, although polyphenols are less prone to diffuse into oil than into water, the concentrate contains a small water percentage. Therefore, in the mixing step, a sufficient polyphenols direct transfer and diffusion from the concentrate into the oil is obtained, without forming water-in-oil emulsions or polyphenol deposits that would remain separate from the oil.

Therefore, the well-known drawbacks associated to water emulsions in food oils are overcome, i.e. water microdroplets causing not only oil oxidation, but also polyphenols oxidation. Moreover, if such an emulsion were present, polyphenols would preferably remain in the dispersed water phase, and would not perform their antioxidative effect on the oily phase, along with the other well-known favourable effects, besides chemical stability improvement, also oil high organoleptic quality preservation. Moreover, water emulsions would unavoidably promote a water-oil phase separation, which would occur with time.

Moreover, the oil is enriched in solutes that are often used as integrators in nutraceutical food or in cosmetics, and which would otherwise be lost along with vegetation water.

In comparison with the prior art known from WO2016087428A1, in which a polyphenol-enriched aqueous juice is mixed to oil, the following advantages are provided. Firstly, a sufficient viscosity of the concentrate is attained in a short time, and has small energy requirements, starting from the aqueous juice separated from the olive residues. Secondly, the amount of polyphenols in the concentrate does not need to reach very high values in order to allow their effective transfer to the oil phase. Moreover, further important nutritive substances of the olives are transferred back to the oil or transferred to food or cosmetic oils. On the contrary, in WO2016087428A1, the polyphenols that are used are separated from the vegetation water at a very high cost, by means of chromatographic separators or by other expensive methods. Further, in the case of the polyphenol-enriched aqueous solution of WO2016087428A1, a high polyphenol concentration must be achieved in order to perform the transfer, which leads to a waste of polyphenols in the water residue that is finally separated from the oil and no longer re-used.

Preferably, the concentrate has a polyphenol concentration higher than 2.5%. Preferably, the concentrate has a polyphenol concentration lower than 15%.

Preferably, the concentrate has a total solute concentration set between 40% and 65% w/w, corresponding to a solid material as a dry residue. Advantageously, the solute amount is selected in such a way that the composition, at a temperature set between 20° C. and 25° C., has a density ranging between 1.20 and 1.35 $g/cm^3$ and a viscosity ranging between 400 and 800 mPa·s.

Advantageously, the step of mixing comprises a step of conveying the base olive oil and of the concentrate along a path with a restricted flow section. For instance, the restricted flow section of the path is selected from the group consisting of:

a peripheral section of a container defined by a wall of the container and by a piston translating within the container;

a flow section of a duct arranged outside of a container and in hydraulic connection between two end portions of the container, the step of conveying being performed by a pump having its own suction and delivery mouths arranged along the duct;

a flow section of a duct arranged outside of a container and in hydraulic connection between a first chamber and a second chamber of the container, the first chamber and the second chamber defined in the container by a piston fluid-tightly slidingly arranged within the container;

a plurality of passage holes of at least one plate of a filter press, the filter press alternately fed with the concentrate and the base olive oil.

The step of mixing can comprise a step of bubbling an inert gas, in particular nitrogen or argon, with respect to the base olive oil in a bottom portion of a container containing the base olive oil and the concentrate.

Preferably, the step of mixing comprises a step of stirring the base olive oil and the concentrate into a container, the step of stirring carried out by an axial-flow impeller. In this case, the step of introducing the gas is carried out in a lower proximity of the axial-flow impeller.

The step of resolving of the must can be carried out by separating liquids having different surface tension values, in particular, in a sinolea equipment.

In an exemplary embodiment, the step of removing water comprises a step of vaporizing water, in particular performed at a pressure lower than the atmospheric pressure. In this way, the water removal can be carried out by evaporation at a relatively mild temperature, i.e. at a temperature normally set between 75° C. and 25° C., and preferably set between 65° C. and 45° C., which is compatible with polyphenol stability.

In another exemplary embodiment, the step of removing water comprises a step of reverse osmosis, wherein said concentrate is retained by a membrane and said water is removed by permeation through said membrane.

Advantageously, the step of removing water is preceded by a step of micro-filtering and/or nano-filtering the vegetation water, the step of nano-filtering having a cut-off lower than 1000 Dalton, in order to remove microorganisms and macromolecules.

The step of separating vegetation water from the aqueous juice can provide steps of:
introducing the aqueous juice into a separator, in particular into a vertical centrifugal separator, obtaining an olive paste containing residual polyphenols besides vegetation water;
conveying an amount of said vegetation water back to the separator, in order to dilute the olive paste and counteract the transfer of the residual polyphenols from the oil into the vegetation water.

This way, the oil phase that is still present in the aqueous juice comes into contact with a dilution liquid containing polyphenols, and does not therefore undergo further polyphenol dilution, which would otherwise occur if potable water were used for dilution purpose, as in the prior art, which would extract polyphenols from the recovered oil.

Like in the conventional olive oil production processes, the step of transforming olives into an oily must can comprise a step of reducing the olives into an olive pulp and a subsequent step of treating the olive pulp in such a way to cause the lipid component to be expelled from the oil bodies of the olive pulp, and a to cause the lipid component to coalesce. Preferably, the step of reducing olives into an olive pulp comprises a step of removing pits, or, as an alternative, a step of crushing, in particular in a disc or hammer mill, and in this case the step of treating the olive pulp is carried out in the presence of pit fragments, and therefore a step is provided of separating the pit fragments from the oily juice downstream of the step of resolving the oily must. In an exemplary embodiment, the step of treating the olive pulp comprises a step of malaxation.

The above indicated objects are also reached by an apparatus for making a polyphenol-enriched olive oil, comprising:
a device configured to obtain an oily must from olives;
a first separation equipment configured to resolve the oily must into:
an oily juice containing a base olive oil, and
an aqueous juice, the aqueous juice containing polyphenols;
a second separation equipment configured to separate a vegetation water from the aqueous juice,
the main feature of said apparatus being that it also comprises:
a concentration equipment configured for receiving the vegetation water and for removing water from said vegetation water (9), in order to obtain a polyphenol-enriched concentrate;
a mixing equipment configured for mixing the base olive oil with the concentrate, so as to transfer polyphenols from the concentrate into the base olive oil and to obtain a polyphenol-enriched final oil as well as an exhausted concentrate.

According to the invention, the mixing equipment comprises a path with a restricted flow section and is configured for conveying the base olive oil and the concentrate through the restricted flow section of the path. In particular, the mixing equipment comprises a container arranged for receiving the base olive oil and the concentrate, the mixing equipment (r,r') is configured for conveying the base olive oil and the concentrate together through the restricted flow section of the path, and the restricted flow section of the path can be selected from the group consisting of:
a peripheral section of the container defined by a wall of the container and by a piston translating within the container;
a flow section of a duct arranged outside of the container and in hydraulic connection between two end portions of the container, wherein a pump has its own suction and delivery mouths arranged along the duct;
a flow section of a duct arranged outside of the container and in hydraulic connection between a first chamber and a second chamber of the container, the first chamber and the second chamber defined in the container by a piston fluid-tightly slidingly arranged within the container.

In particular, the mixing equipment comprising a container arranged for receiving the base olive oil in addition to the concentrate, and in which the restricted flow section comprises a peripheral section of the container defined by the wall and by the piston, comprises a gas delivery/spread means configured for causing an inert gas to bubble with respect to the base olive oil in a bottom portion of the container.

As an alternative, the mixing equipment comprises a filter press comprising at least one plate having a plurality of holes, and having a feed means for alternately feeding the concentrate and the base olive oil, so as to force them to flow through the holes, and feeding means for alternately feeding the concentrate and the base olive oil, so as to force them to flow through the holes.

As in the conventional olive oil production processes, the device for obtaining an oily must can comprise:
- an apparatus configured for reducing the olives into an olive pulp, said device selected from the group consisting of: a primary pit removal equipment and an olive crusher or mill configured to crushing olive pits, which can be selected between a hammer crusher and a disc crusher;
- an apparatus configured for causing a lipid component to leave the oil bodies contained in the olive pulp, and to coalesce, in particular a malaxer.

In the first case, the malaxer is configured like a planetary kneader, in order to gently mixing the olive pulp along with pit fragments, and is also provided with a secondary pit removal equipment equipped with a grid configured to separate pit fragments from the base olive oil and from the residual pulp contained in the oily juice downstream of the first separation equipment.

In an exemplary embodiment, the first separation equipment is a sinolea equipment configured to separate liquid phases having different surface tension values.

In an exemplary embodiment, the concentration equipment comprises at least one evaporation unit, in particular said evaporation unit is configured to operate at a reduced pressure, in order to carry out the evaporation at a relatively mild temperature, as anticipated.

In an alternative exemplary embodiment, the concentration equipment comprises an osmosis device configured to carry out a reverse osmosis of the vegetation water, wherein the concentrate is retained by a water-permeable membrane and the water is removed by permeation through said membrane.

Advantageously, the apparatus comprises a micro-filtration unit and/or a nano-filtration unit upstream of the concentration equipment, the nano-filtration unit having a cut-off lower than 1000 Dalton, in order to remove microorganisms and macromolecules.

According to another aspect of the invention, a composition is provided for use in food oils, dietary supplements, cosmetics, bio-repellents, medicaments for treating skin diseases, said composition obtained by a step of removing water from a vegetation water in an olive oil production process, and further comprising:
- a predetermined solute amount, set between 40% and 65% w/w, corresponding to solid material as dry residue;
- water, wherein the composition comprises between 2.5% and 15% w/w of total polyphenols included in said solute amount, in particular at least 30% of said total polyphenols is hydroxytyrosol. Advantageously, the solute amount is selected in such a way that the composition, at a temperature set between 20° C. and 25° C., has a density set between 1.20 and 1.35 g/cm$^3$ and a viscosity set between 400 and 800 mPa·s. This enables an effective contact between the concentrate and the virgin olive oil, or any other food or cosmetic oil, which is effective to transfer the polyphenols from the concentrate to the oil, due to the high polyphenol concentration difference between the two phases. On the other hand, although polyphenols are less prone to diffuse into oil than into water, the concentrate contains a small water percentage. Therefore, by the mixing step a sufficient polyphenols direct transfer and diffusion into the oil is obtained, without forming water-into-oil emulsions or polyphenols deposits that would remain separate from the oil.

Vegetal or animal oils also fall within the scope of the invention, said oils having a polyphenol content higher than 300 ppm, preferably set between 300 and 700 ppm, and having a hydroxytyrosol concentration higher than 10 ppm, in particular set between 40 and 120 ppm, said oils obtained by mixing the composition with corresponding standard oils, and by subsequently removing exhausted water.

According to further aspects of the invention, further products are provided, such as dietary supplements for human or animal use, cosmetics, bio-repellent products containing the above-described composition.

According to further aspects of the invention, a medicament is provided for treating skin diseases such as psoriasis and acne vulgaris, containing the above-described vegetable or animal oil.

According to another aspect of the invention, a process is provided for making a composition for use in food oils, dietary supplements, cosmetics, bio-repellents, medicaments for treating skin diseases comprising the steps of:
- prearranging an amount of olives to be treated;
- transforming the olives into an oily must;
- resolving the oily must into:
  - an oily juice, from which a base olive oil is obtained, and
  - an aqueous juice;
- preparing a base olive oil from the oily juice;
- separating vegetation water from the aqueous juice, in particular carried out in a vertical centrifugal separator, the main features of said process being providing steps of removing water from said vegetation water in such a way the composition is obtained in the form of a concentrate comprising a solute amount set between 40% and 65% w/w, corresponding to solid material as dry residue; water; and between 2.5% and 15% w/w of total polyphenols included in said solute concentration;
- discontinuing the step of removing water when the vegetation water while turning into the concentrate achieves a predetermined viscosity and/or density.

Preferably, before the step of removing water, a step is provided of micro-filtering and/or nano-filtering the vegetation water, and in the step of resolving the must, the aqueous juice is diluted with an amount of the vegetation water drawn as the permeate downstream of the step of micro-filtering and/or nano-filtering.

BRIEF DESCRIPTION OF THE DRAWINGS

The invention will be now shown with the following description of exemplary embodiments and examples thereof, exemplifying but not limitative, with reference to the attached drawings, in which.

DETAILED DESCRIPTION OF THE INVENTION

Figure 6:
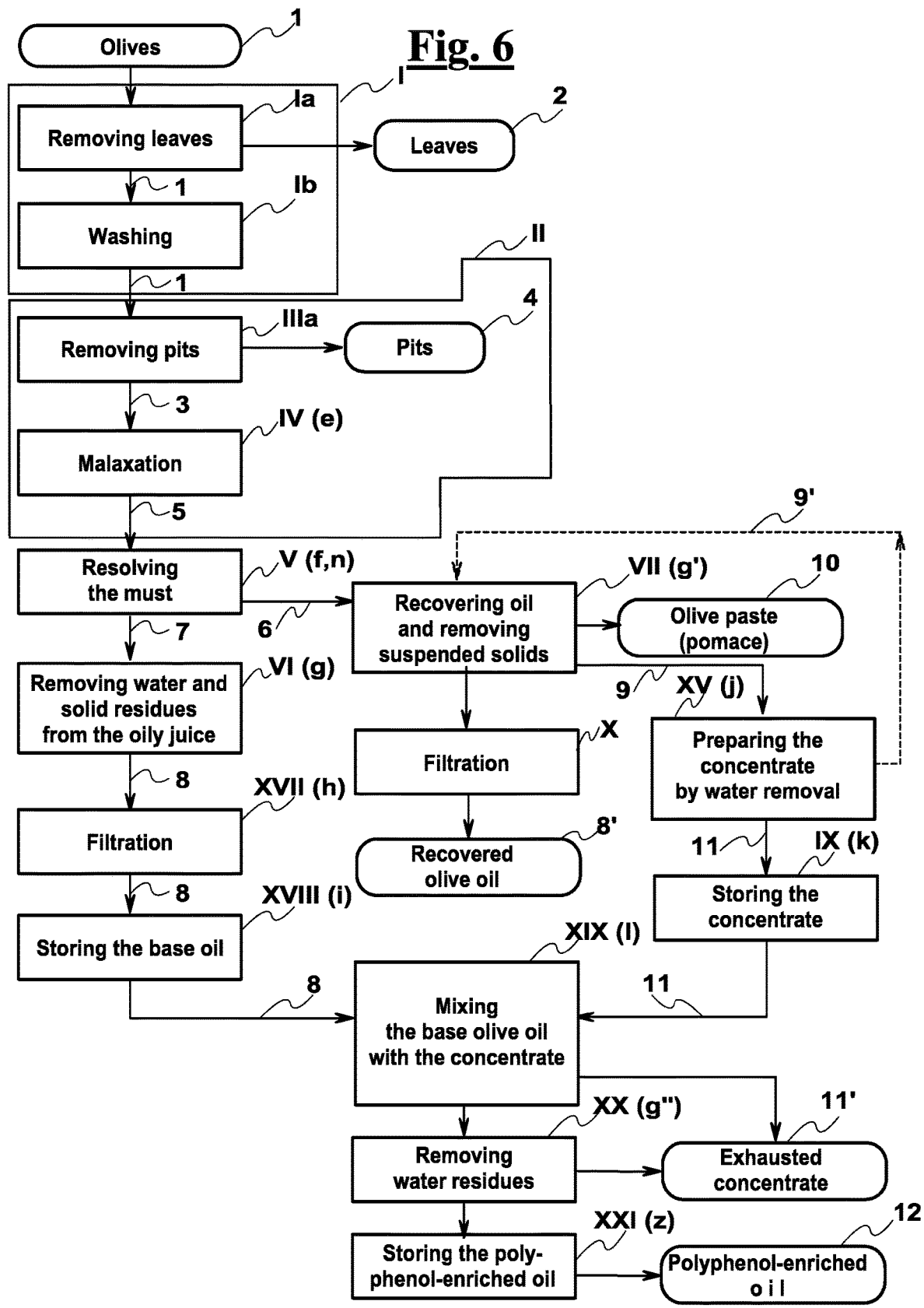
FIG. 6 is a block diagram of a process, according to an exemplary embodiment of the invention, in which the step of transforming the olives comprises a step of removing pits followed by a step of malaxation.
Figure 7:
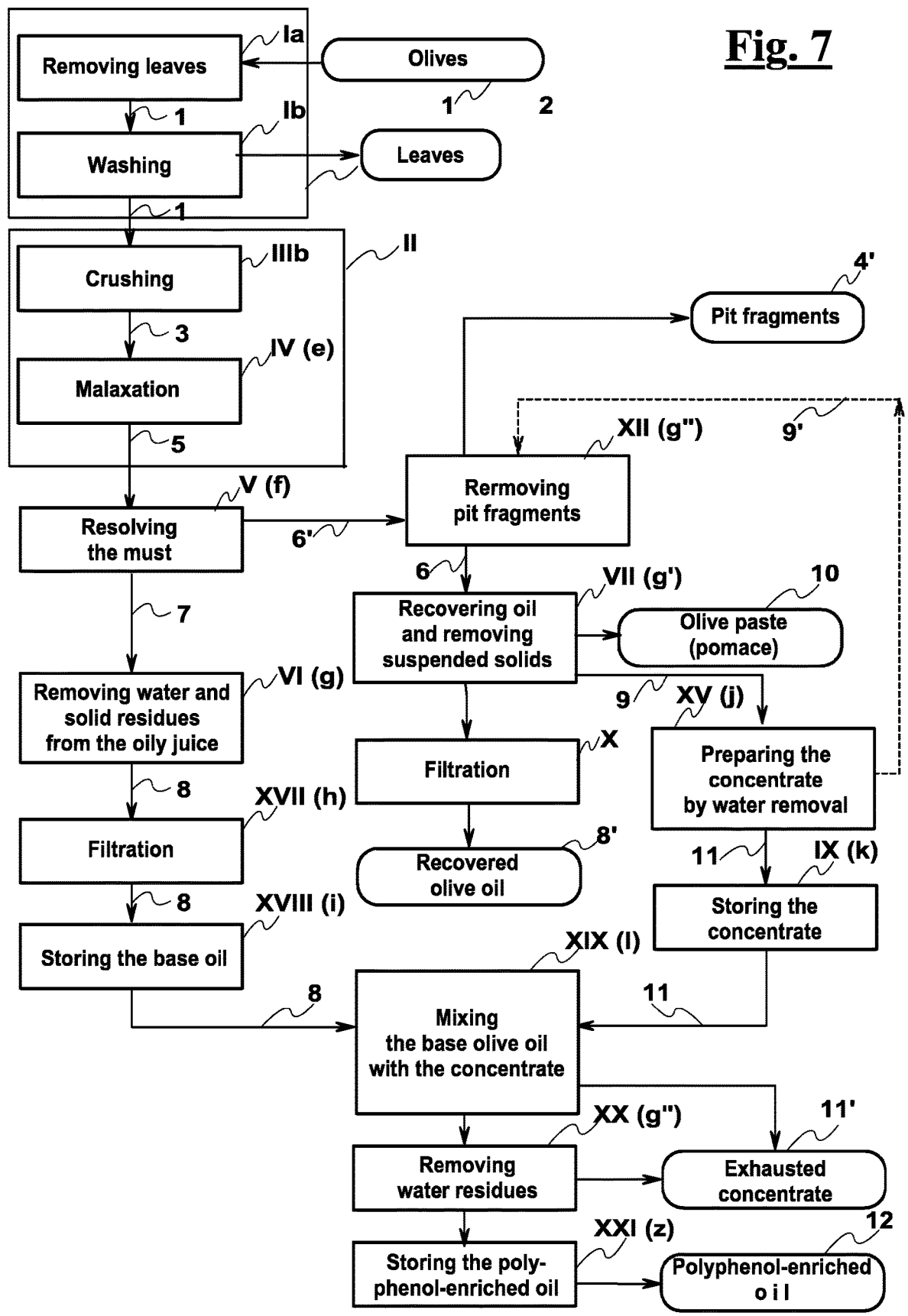
FIG. 7 is a block diagram of a process, according to an exemplary embodiment of the invention, in which the step of transforming the olives comprises a step of crushing followed by a step of malaxation.

In the following description, the steps of the process are indicated by Roman numerals, the fluids and the material involved are generally indicated by Arabic numerals and the equipment in use is indicated by letters. In particular, the block diagrams of FIGS. 2, 6 and 7 show the steps of the process and, between parentheses, the equipment that can be used to carry out these steps, according to some embodiments of the invention.

Figure 1:
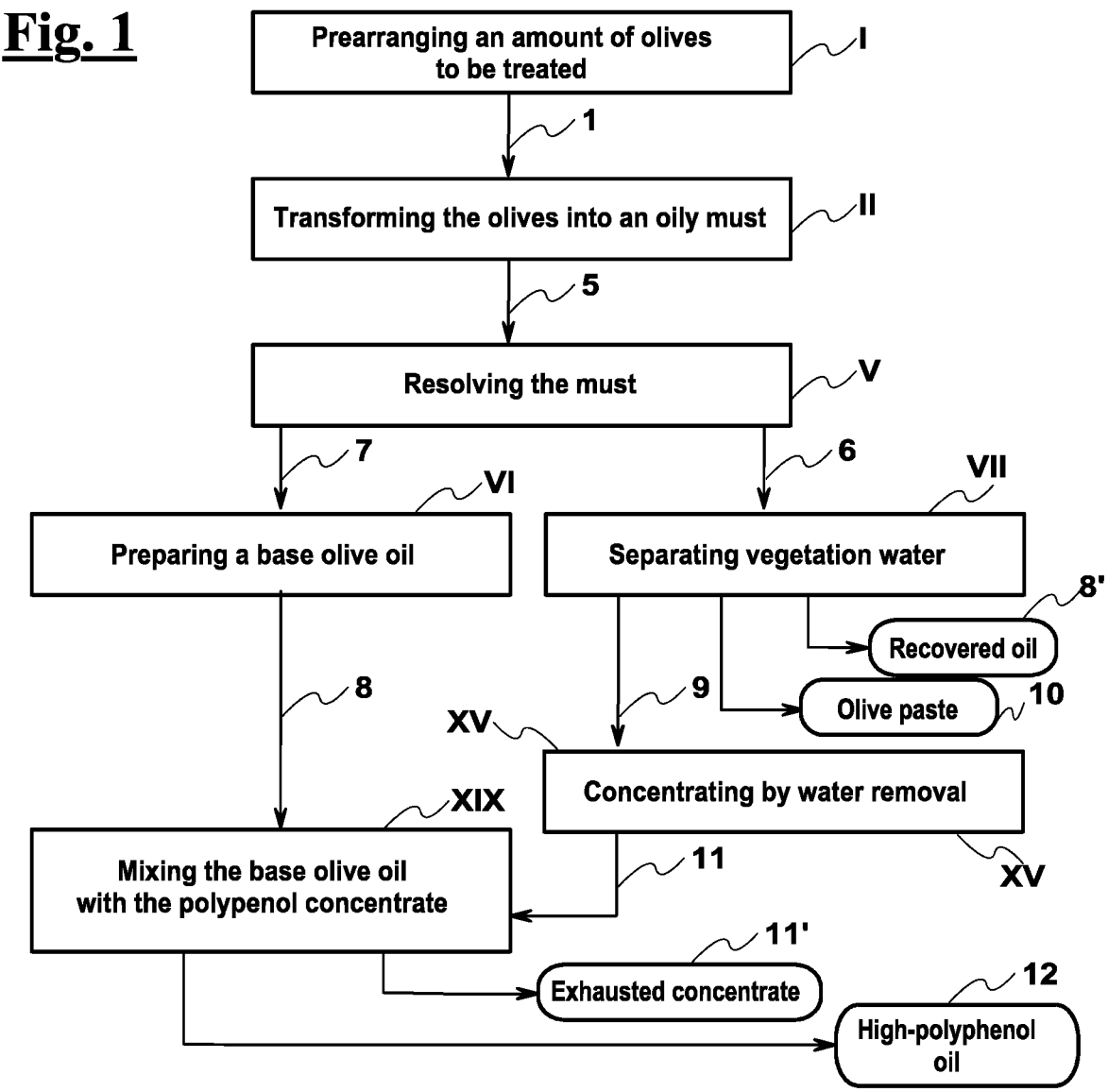
FIG. 1 is a block diagram of a process for making virgin olive oil with a high polyphenol content, according to the invention.
Figure 2:
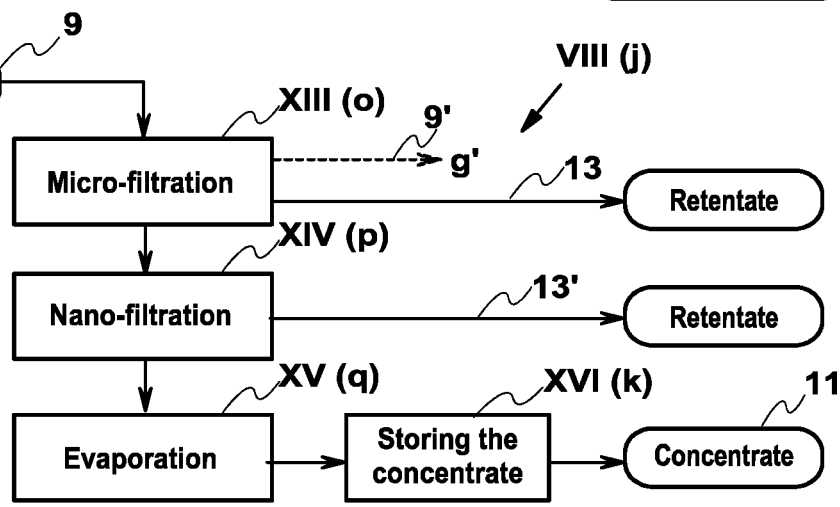
FIG. 2 is a block diagram of a step of the process of FIG. 1 for preparing the polyphenol concentrate.

With reference to FIGS. 1 and 2, a process is described for making a polyphenol-rich olive oil according to the present invention, in which, after a step I of prearranging an amount of olives 1, e.g. a step comprising such operations as removing leaves and/or washing olives 1 (FIGS. 6 and 7), a step II is provided of transforming olives 1 into an oily must 5, by treatments known in the olive mill industry, such as pit removing or crushing followed by malaxation (FIGS. 6 and 7), and possibly followed by a UV-treatment of the olives, in order to lower the microbial load.

A step V, also known in the art, follows of resolving oily must 5 into an oily juice 7, from which a virgin olive oil is obtained by conventional methods, i.e. by a transformation step VI. This step can comprise preliminarily removing water and a solid residue, as described more in detail hereinafter with reference to FIG. 6. Aqueous juice 6, containing a large amount of polyphenols, originally present in the olives due their high solubility into water, is treated in a separation step VII, known in the art, from which an amount of residual oil 8' is recovered, and an aqueous fraction 9 is obtained, known as vegetation water, which contains the most part of polyphenols, along with a predetermined amount of other solutes, typically macromolecules such as carbohydrates, nitrogen-containing substances, polyalcohols; fats; organic acids and mineral compounds, besides a doughy fraction called olive paste or pomace 10.

According to the invention, the process also comprises a step VIII of preparing a polyphenol-enriched concentrate 11, starting from vegetation water 9, as described more in detail hereinafter with reference to FIG. 2. Preparation VIII of concentrate 11 is based on a step XV of removing water from vegetation water 9, for example, by evaporation or reverse osmosis. Concentrate 11 so obtained comprises also solutes, at a final concentration responsive to the initial solute initially contained in the vegetation water and to the removed amount of water. Such technologically important features as density and viscosity of concentrate 11, which has a substantially honey consistency, depend upon the final solute concentration.

The invention provides also a step XIX of mixing base olive oil 8 with concentrate 11, during which polyphenols are transferred from concentrate 11 to base olive oil 8, and a polyphenol enriched final virgin olive oil 12 is obtained, besides an exhausted concentrate, i.e. a concentrate containing a high solute amount and a lower polyphenol content.

With reference to FIG. 2, a step VIII is described of preparing a concentrate 11 having a high polyphenol concentration from vegetation water 9 in a concentration equipment generally indicated as j for coherence with subsequent FIGS. 6 and 7. Preparation VIII is based on a step XV of removing water from vegetation water 9, before which steps can be advantageously provided of removing and/or inactivating microbes and/or endogenous enzymes initially contained by the olives and then present in the vegetation water, but also exogenous enzymes of the microbial population. To this purpose, the concentration equipment (j) can comprise a plurality of units having respective specific functions, as described below.

In particular, a step XIII can be provided of micro-filtering vegetation water 9, preferably in a micro-filtration unit (o) equipped with membranes having a porosity ranging from 0.20 to 0.45 μm. A retentate 13 of the step (XIII) of micro-filtering can be used for producing biogas, or as a fertilizer, according to the applicable regulations, whereas the permeate can be sent to step XV of removing water, or to an ultra-filtration or nano-filtration step XIV preferably in a nano-filtration unit (p) having a cut off between 1000 and 200 Dalton. In this case, a retentate 13' of nano-filtration step XIV can be used the same way as retentate 13 of micro-filtration XIII, whereas the permeate of the nano-filtration step is sent to step XV of removing water.

As already described, the removal of water from vegetation water 9 can be carried out by various techniques, in particular by evaporation or by reverse osmosis. More in detail, the evaporation can be carried out by various possible apparatus, generally indicated as (q), which can operate at a reduced pressure and at a temperature set between 75° C. and 25° C., preferably between 65° C. and 45° C. As an alternative, or in addition, heat pump evaporators with "scrapering device" can be used, which allow for very high concentration factors. Concentrate 11 collected from evaporator (q) has a total polyphenol content that can range from 2.5% to 15%, more frequently from 3.2% to 6.0%, and a free hydroxytyrosol content that can range between 20% and 40% of total polyphenol content. Concentrate 11 can be used immediately, in a subsequent step of treating base virgin olive oil 8 as separated in step V of resolving oily must 5. As an alternative, or in addition, a step XVI can be provided of storing such concentrate, for instance, into a reservoir (k), for subsequent and different uses.

Figure 3:
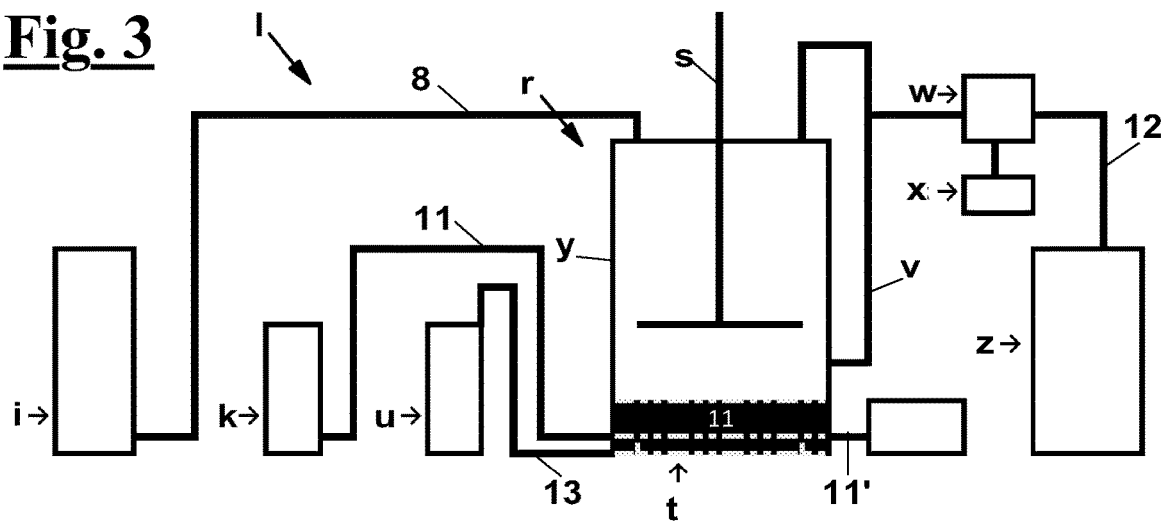
FIGS. 3, 4 and 5 are flow diagrams of devices for transferring polyphenols from the concentrate to a base or standard virgin olive oil.
Figure 4:
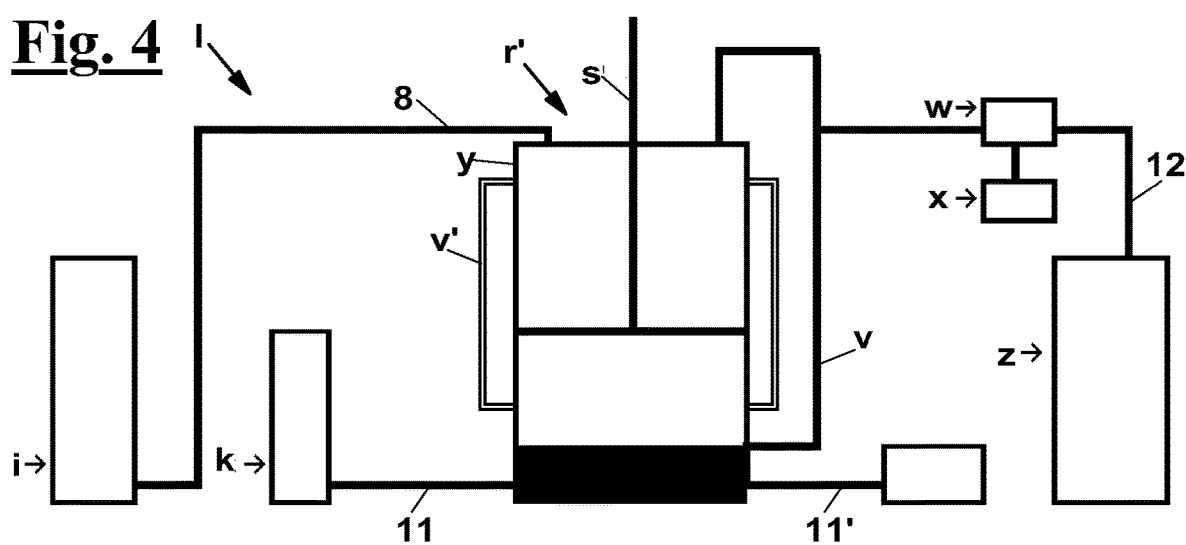
Figure 5:
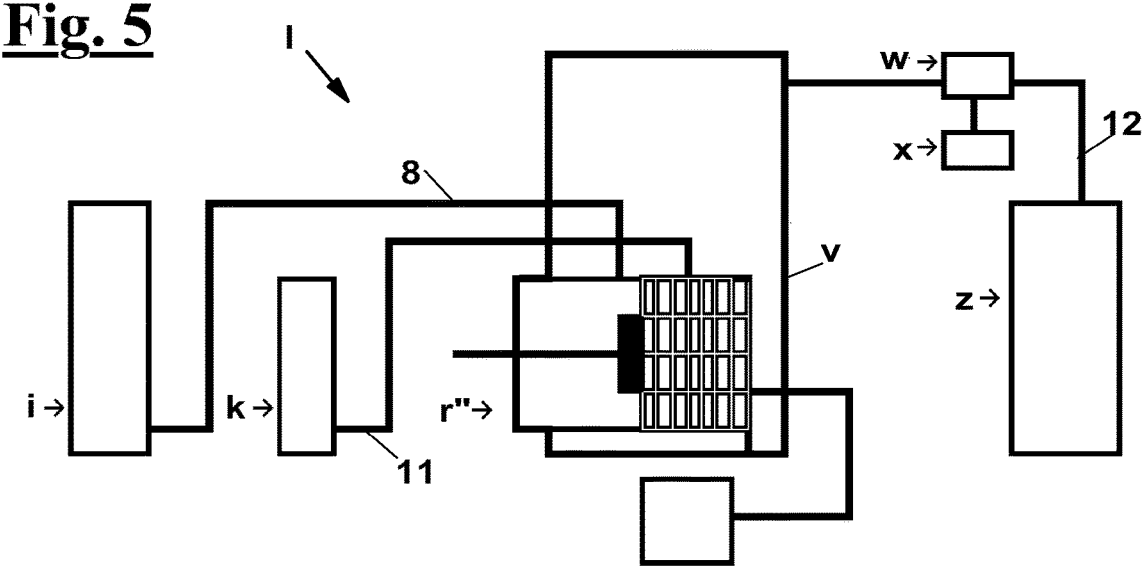

With reference to FIGS. 3-5, a step XIX of polyphenol oil enrichment is described, by mixing it with an aqueous concentrate obtained as described above, and transferring polyphenols from the concentrate to the oil. The oil can be a virgin olive oil, such as base virgin olive oil 8 obtained from step VI of removing water and solid residues from oily juice 7 in the process according to the invention, or can be any standard virgin olive oil, or any seed oil, or any animal oil.

Step XIX of transferring polyphenols can be performed in a mass transfer device, generally indicated as (I) in FIGS. 6 and 7, as described hereinafter, comprising a plurality of units that have respective purposes. Concentrate 11, which may be withdrawn from reservoir (k) and base or standard virgin olive oil 8, which may be withdrawn from reservoir (i) (FIG. 2) are conveyed into a mass transfer equipment (r) of a mass transfer device (I) comprising a container (y), preferably made of stainless steel, and suitable for liquid food, in which an inert environment is maintained.

Mass transfer equipment (r) is advantageously equipped with a temperature control system, not shown. The phase consisting of concentrate 11 is much denser than base or standard virgin olive oil 8, and tends therefore to settle on the bottom of container (y). The volume ratio of concentrate 11 to base or standard virgin olive oil 8 is set according to the difference of polyphenol concentration between concentrate 11 and base or standard virgin olive oil 8, according to the desired concentration in polyphenol-rich final virgin olive oil 12, and according to the allowable time in which this concentration will be achieved. In particular, a volume of concentrate 11 set between 5 ml and 40 ml can be used for each litre of virgin olive oil, more frequently volume of concentrate between 10 ml and 30 ml for each litre of virgin olive oil. Mass transfer equipment (r) can be also equipped with of a stirring device, not shown, for causing a mild mixing of the fluid mass, in order to improve the contact of the whole amount of base or standard virgin olive oil 8 with concentrate 11, but without forming emulsions or foam. Mass transfer equipment (r) is also equipped with a mechanical piston (s).

A flow 13 of an inert gas, such as nitrogen or argon, coming from a reservoir (u), is caused to pass through the mass of concentrate 11 by a gas-spreading device (t). Oil phase 8, which is in contact with concentrate 11, is continuously drawn from the bottom and fed again to the top of the container, through an external circuit (v). Such a recirculation of the virgin olive oil enhances and speeds up the polyphenols transfer from concentrate 11 to base or standard virgin olive oil 8 until the latter is changed into final virgin olive oil 12. The recirculation flowrate in the external circuit (v) is adjusted at such a value that no excessive emulsion and/or foam is formed. The external recirculation circuit (v) advantageously comprises a device for taking samples, such as one comprising a three-way valve (w) arranged along the circuit, so as to selectively convey a sample of the oil being transformed and recirculated to a sample point (x), in order to evaluate the currently attained polyphenol concentration as well as further oil parameters, or to collect final high-hydroxytyrosol olive oil 12 into a storage reservoir M.

Mass transfer device (I) of FIG. 3, according to an exemplary embodiment, having a predetermined capacity, can operate in both batch and continuous mode.

In batch mode, the apparatus is advantageously maintained at a temperature set between 25° C. and 40° C. for a time ranging between 20 and 60 minutes. For instance, in a 5000 litre reservoir 150 litres of concentrate 11 and 4850 litres of base or standard virgin olive oil 8 are introduced. 10 minutes later, a plurality of samples are subsequently taken in order to evaluate the polyphenol concentration currently attained, along with other oil parameters.

Once the desired polyphenol concentration has been achieved, or when the concentration does not substantially increase for at least 60 minutes, the oil is preferably sent to a step XX (FIGS. 6 and 7) of removing water residues, typically in a vertical centrifugal separator (g") operating as a cleaner separator. A step XXI can be finally provided of bottling polyphenols-enriched final olive oil 12, or of collecting it into a storage reservoir (z).

A concentrate residue, i.e. an exhausted concentrate 11', still containing a high polyphenols amount, is left in container (y) of mass transfer equipment (r). This residue is sent to a collection device, not shown, and can be used for other purposes. At this point, mass transfer device (I) is ready for treating a new batch.

In the continuous mode, mass transfer equipment (r) is steadily supplied with both fresh base or standard virgin olive oil 8 and fresh concentrate 11, while polyphenol-rich virgin olive oil 12 and exhausted concentrate 11' are withdrawn steadily as well, at such flowrates that the volume ratio of base or standard oil 8 to concentrate 11 is maintained at a fixed value.

For instance, flowrates like 1000 l/hr virgin olive oil 8 and of 30 l/hr concentrate 11 meet the production capacity of virgin olive oil 8 and concentrate 11 described in this patent application, and can be used in most of today's oil mills.

With reference to FIG. 4, a transfer equipment (I) is shown according to another exemplary embodiment, which differs from the one of FIG. 3 in that a mass transfer equipment (r') does not comprise the nitrogen gas-spreading device (t) and in that it comprises a piston (s') fluid-tightly arranged within the container, and in that it comprises at least one further external recirculation circuit (v'), configured to lift and to recirculate the oil from a chamber defined below the piston to a chamber defined above the piston, through the circuit (v') and the circuit (v). In this case, the polyphenol transfer takes place in less turbulent but more transfer-effective conditions, since the oil at the boundary layer of the two immiscible liquids is renewed continuously. This device can work in the same operating conditions as the device of FIG. 3.

With reference to FIG. 5, a transfer equipment (I) is shown according to another exemplary embodiment, in which the polyphenol transfer is carried out in a filter press (r"). The spaces between the plates of the filter press are initially filled with an amount of concentrate 11, and then base or standard virgin olive oil 8 is forced to pass through the filter press. The volume ratio of the two liquids is normally set between 10 and 30 ml of concentrate 11 for each litre of base or standard virgin olive oil 8. In these conditions, the oil that flows through the filter is recirculated during 5 to 10 minutes, which is enough to obtain an effective polyphenol transfer.

As an alternative, according to an exemplary embodiment, not shown, the mixing equipment can comprise a container internally provided with a stirrer equipped with an axial-flow impeller. In this case, the gas delivery/spread means is preferably arranged in such a way to cause an inert gas to bubble through to the base olive oil in a bottom portion of the container.

In an exemplary embodiment, not shown, as an alternative to evaporation, step XV of removing water from vegetation water 9 is carried out by reverse osmosis, i.e. by retaining the concentrate being formed by a water-permeable membrane, while the water is removed by permeation through said membrane.

According to the invention, as the attached examples show, a new olive oil can be obtained, e.g. a virgin olive oil, an extra-virgin olive oil or a differently classified oil that has a free hydroxytyrosol concentration higher than 10 ppm, and preferably set between 40 ppm and 120 ppm, by mechanical means only. It should be considered that, on average, virgin olive oils, in the highest quintile, have a hydroxytyrosol content of 3.6 ppm.

FIGS. 6 and 7 show some exemplary embodiments and modifications of the process according to the invention.

In an exemplary embodiment, before removing the pits or crushing the olives, as described hereinafter, step I of prearranging olives can comprise a step of removing leaves 2 from olives 1 as they are picked up, in a conventional vibrating screen (b) fed by a hopper (a).

Prearrangement step I can also provide a preliminary step Ib of washing with water, typically in a washing basin (c) where olives 1 are advantageously moved. Preferably, washing step Ib is carried out at 50 to 60° C. and for a time set between 1 and 4 minutes, in particular for a time of about 2-3 minutes. The washing temperature and time are determined responsive to the temperature of olives 1 and to their "cleanliness" conditions. The washing water is advantageously frequently changed, in order to better remove and/or inactivate microorganisms and/or enzymes and contaminants due to the treatments to which the olive trees have been subjected. Moreover, step II of washing is carried out at a warm temperature, in order to mitigate the activity of Polyphenol Oxidase that, in the presence of oxygen, would enhance oxidation of biophenols that, on the contrary, must be preserved in the oil.

Step II of transforming olives 1 into must 5 provides, in the conventional olive mill industry, steps IIIa/b of removing pits (FIG. 6) or of crushing (FIG. 7), to which the olive are normally conveyed by a conveyor belt. If olive-washing step Ib is carried out, the feeding path has a predetermined length, and has a means for generating vibrations during the conveying, so that the olives reach a pit removal equipment (d) (FIG. 6) or an olive crusher (m) (FIG. 7) in a substantially dry condition.

According to an exemplary embodiment of the process, in order to inactivate the microorganisms that are present on the olives, an UV radiation step can be provided, not shown, immediately upstream of step IIIa/b of removing pits or crushing, for example by a UV lamp, not shown, arranged at the end of the conveyor belt.

According to the modification of the process shown in FIG. 6, a step IIIa of removing pits is provided, i.e. a step of integrally separating pits 4 from an olive pulp 3, preferably in a pit removal equipment (d). Pit removal IIIa has the advantage of forming an olive pulp that is substantially free from pit residues. Actually, if such an apparatus is used, only the pulp is subjected to a destructuring action, while pits 4 remain unchanged and can be easily separated. Olive pulp 3, instead, along with vegetation water, can be directly sent to a so-called malaxation step IV.

Moreover, in step IIIa of removing pits, such enzymes as oxidoreductases and peroxidases, which can catalyse biophenols oxidation, are separated from olive pulp 3 along with pits 4.

Besides the advantage of increasing the content of biophenols in the virgin olive oil, the pit removal IIIa has also the advantage of increasing the volatile components, which contributes significantly to improve the organoleptic and nutritional quality, and to extend the shelf-life.

Still with reference to FIG. 6, step II of transforming olives 1 into must 5 comprises a step IV of malaxation of the olive pulp obtained from pit removing step IIIa, which is carried out according to methods well known in the art, in at least one piece of equipment called malaxer(s). In this step, olive pulp 3 is stirred and mixed, so as to squeeze the oil bodies of olive pulp 3 to a maximum extent, and oil droplets are formed.

During malaxation IV, the temperature is preferably maintained between 25 and 32° C. The malaxation time is set responsive to the ripening degree and to the cultivar of olives 1, and is normally set between 25 and 40 minutes that, added to the time required by pit removal and filling the malaxer(s), gives 35-45 minutes. The rheological behaviour of olive pulp 3 is determined by properly selecting the size of the holes of a grid of the pit removal equipment. These parameters affect the lipid component release from the oil bodies, as well as the droplets formation and coalescence to obtain the oil.

During the research activities that have led to the invention, it has been observed that malaxation IV can be carried out in a much easier way if a full inert gas environment is created within the malaxer(s) by means of suitable supply devices, not shown.

As described above, after malaxation IV, step V of resolving oily must 5 is provided, from which aqueous juice 6 and oily juice 7 are obtained. Step V of resolving the oily must can be carried out according to different process modifications, as described hereinafter.

In a first modification, step V of resolving the oily must, in which the oil is separated from the water and from the residual olive pulp, is carried out in a so called so-called "two-steps" horizontal axis centrifugal separator or decanter (f), from which aqueous juice 6 and oily juice 7 are obtained, which are sent to respective vertical centrifugal separator (g', g). Aqueous juice 6 and oily juice 7 qualitatively contain the same components, i.e. oil, vegetation water and suspended pulp solid residue. However, the relative amounts of these three components are very different in the two fluids 6 and 7.

In oily juice 7 the oil, i.e. the oil or lipid phase, are definitely predominant with respect to the vegetation water and to the suspended olive pulp solid residue. In this case, the vertical centrifugal separator (g) is configured to carry out step VI of removal the water and the scarce solid residue from oily juice 7 at a maximum extent, in order to obtain virgin olive oil 8, and for this reason is called the centrifugal cleaner (g). A final filtration step XVII can be carried out in a conventional filter (h), followed by a step XVIII of storing the oil into a reservoir (i). Virgin olive oil 8 is also indicated here as the base olive oil in order to distinguish it from high-polyphenol final virgin olive oil 12.

On the contrary, the vegetation water predominates in aqueous juice 6, but both suspended solids (8÷22% v/v) and oil (0.8-1.0% v/v) are also present, which can be recovered according to the invention. In this case, the vertical centrifugal separator (g') is configured to carry out step VII of recovering the oil and of removing the suspended solids to a maximum extent, and for this reason it is called the separator/clarifier (g').

In comparison with the prior art, the present invention introduces a clear innovation in this step of the olive milling process performed in an oil mill, which consists of using aqueous juice 6, which is usually considered as a waste, to increase the polyphenol content in the olive oil, by means of apparatus and related methods that make it possible to exploit not only the olive lipid component, but also the recovered vegetation water 9 and the pulp residue.

By the process schematically shown in FIG. 6, two important goals are attained, and some limitations of the prior art processes are overcome:

a maximum recovery of the oil extracted during step IV of malaxation is obtained, even if pits 4 are preliminarily removed in pit removing step IIIa;

a first step polyphenols recovery is performed, before further subsequent steps in which a full extraction process of the virgin olive oil is accomplished, according to this invention, so that the recovered polyphenols are still available for mass exchange with the lipid phase, to the purpose, attained by the invention, of transferring them to the oil.

From vertical centrifugal separator/clarifier (g') is recover:

a fraction of residual virgin olive oil 8';

a second, substantially oil-free and polyphenol-rich olive paste 10, containing 16% to 22% w/w suspended settleable solids;

a vegetation water 9 containing polyphenols and other solutes, typically macromolecules such as carbohydrates, nitrogen-containing substances, polyalcohols; fats; organic acids and mineral compounds.

Also in this case, can be provided steps of filtering X and of storing the oil recovered 8'.

In a second modification, step V of separating the oil 8 from oily must 5 is made by a so-called sinolea equipment (n), exploiting the surface tension difference between the oil and the water, instead of decanter (f), in order to selectively extract one of the two liquids when they are intimately mixed. The oil extracted by sinolea equipment (n) has usually a better quality, than the standard extra-virgin olive oils, really as it contains a larger polyphenol amount. Even in this case, oily juice 7 and aqueous juice 6 are sent respectively to step VI of removing water and the solid residue and to step VII of recovering the oil and of removing the suspended solids, respectively, in vertical centrifugal cleaner separator (g) and clarifier separator (g'), respectively, and the rest of the process is the same as in the first modification.

The process according to the modification of FIG. 7 differs from the one of FIG. 6 firstly in that olives 1 are subjected to grinding or crushing step IIIb instead of pits removing step IIIa, in an olive mill (m), preferably a hammer mill, and a paste 3' produced this way is subjected to malaxation step IV, normally at a same temperature of the modification of FIG. 6, but normally for a shorter time. In this case, oily must 5' also contains pit fragments.

Oily juice 7 is obtained from step V of separating the oil from the water and the residual olive pulp, at an outlet of horizontal centrifugal separator (f), and is conveyed to a centrifugal cleaner (g), while, at another outlet, an aqueous juice 6' is obtained which contains, in this case, fragments of pits, along with a pulp residue, vegetation water and a small amount of oil residue. A second step XII is provided of removing pits from aqueous juice 6', from which the so-called pits fragments 4' are obtained, which is typically carried out in a secondary pit removal equipment (d') equipped with a grid that is different from the ones of the primary olive pit removal equipment (d) as in the modification of FIG. 6. A pit-free aqueous juice 6 is also obtained, which is treated as in the modification of FIG. 6, in an oil-recovery and suspended solids removal step VII that is carried out in a separator/clarifier (g'). The person skilled in the art can easily decide whether a filtration step X is required before storage step XI without departing from the scope of the present invention.

With reference to FIGS. 2, 6 and 7, in order to improve the separation effectiveness of step VII of recovering residual oil 8' and removing the suspended solids, typically in the separator/clarifier (g'), it is preferable to dilute aqueous juice 6 coming from step V of resolving the must.

According to an aspect of the invention, vegetation water 9, which is contained in the olives, becomes valuable since it is used for this dilution. More in detail, aqueous juice 6 is added with micro-filtered vegetation water 9' coming from micro-filtering XIII of step VIII of preparing high-polyphenol concentrate 11 (FIG. 4).

The virgin olive oil obtained by the process described above has a far more durable stability than the extra-virgin olive oils produced with the processes exploited in the oil mills, which are traditionally structured into the steps of crushing-malaxation-centrifugal separation. The virgin olive oil produced according to the invention, due to the total content of hydroxytyrosol and derivatives thereof, fulfils the requirements of EFSA health declaration.

According to a preferred exemplary embodiment of the present invention, as the attached examples clarify, an oil can be obtained with a polyphenol content ranging between 300 and 700 ppm and a free hydroxytyrosol concentration preferably ranging between 40 and 120 ppm. In the scope of the present invention, the oil obtained can be of any of the types provided in the oil classification obtained by mechanical transformation processes.

The analytical methods used to assess the quality and the quantity analysis of the polyphenols in virgin olive oils are widely known and used in the laboratories that provides standard virgin olive oil certifications. The step of evaluating polyphenols in virgin olive oils and in the oils made by the operations that use the apparatus performing mass transfer step XIX can be carried out, for instance, by a spectrophotometric analysis (Varian Cary 50 UV/VIS), by the Folin Ciocalteau method or by an HPLC method.

EXAMPLES

The following examples are presented for illustration purpose and are not intended to limit the scope of the present invention.

Example 1

Preparing a Base Extra Virgin Olive Oil and a High-polyphenol Concentrate

Olive from two typical cultivar of the region Puglia (Italy), Ogliarola and Coratina, have been subsequently treated, in this order, in a same plant comprising an equipment manufactured by the firm Amenduni, according to the process shown in FIG. 7, but without forming an inert gas environment in the olive crusher (d) neither in the malaxer (e). The plant has been washed between one cultivar and the following one. In each case, about 9000 Kg of olives have been treated in 3 hours.

The olives were harvested in the same day in which the treatment took place. Immediately after removing the leaves, the olives were washed in a first basin with frequently renewed cold water, and then in a second basin with water at 55-58° C., for 2-3 minutes. The washing was carried out outdoors, at about 11° C. The time between removing the olives from the second basin and feeding the olive crusher (d), also located outdoors, allowed the olives to cool such that, at the malaxer (e) inlet, they were at about 22-25° C. The malaxer (e) temperature was controlled with water to 30° C. whereby, after ca. 30 minutes mixing, oily must 5' had reached a temperature of about 28° C. The oily must was sent to step V of resolution in a decanter (f) operating in a two-phase mode, where an oily juice 7 and an aqueous juice 6 were obtained. Oily juice 7 was sent to a vertical centrifugal cleaner separator (g) in order to remove water residues and was then filtered and stored in a steel reservoir (i) where it was available for a final polyphenol transfer step XIX.

Aqueous juice 6 has been started first to a secondary pit removal equipment (d'') to remove pit fragments 4' and then to a second vertical centrifugal clarifier/separator (g') that made it possible to recover:

a) a second oil fraction 8';
b) a polyphenol-rich olive paste 10;
c) vegetation water 9.

The vegetation water was sent to the concentration equipment (j) of FIG. 2 to obtain a high-polyphenol concentrate 11. More in detail, steps of micro-filtration (XIII) and nano-filtration (XIV), with a cut-off <1000 Dalton, were subsequently carried out in order to remove microorganisms and macromolecules, and the nano-filtration permeate was concentrated by evaporation (XV) under vacuum at 65° C., and then cooled and stored in a stainless steel reservoir (k).

Figure 8:
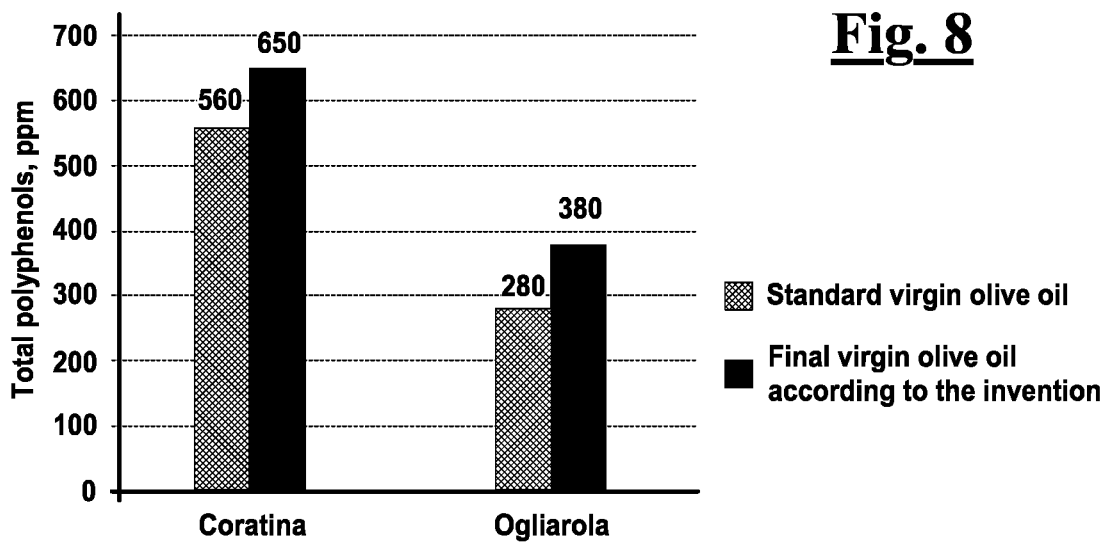
FIGS. 8 and 9 are diagrams showing the polyphenol and hydroxytyrosol concentration in two oils obtained by the method of the invention, compared with the base oils from which these oils are obtained, respectively.

Samples of standard virgin olive oil of the two cultivars and of the high-polyphenol oily juice were sent to a laboratory to be analysed according to the IOC (International method with the (International Olive Council)-HPLC method. The results are shown in FIG. 8. In particular, the Coratina oil and the Ogliarola oil had significantly different total polyphenols amounts, i.e. 560 and 280 ppm, respectively, as expected, due to the nature of the two cultivars. High-polyphenol concentrates 11 from the two cultivar had a total polyphenol content of about 56000 and 29000 ppm, respectively, of which about 16800 and 9800 ppm hydroxytyrosol, respectively.

Example 2

Transferring Polyphenols from Concentrate 11 to the Base Virgin Olive Oil and Preparing a Polyphenol-rich Virgin Olive Oil Coratina and Ogliarola oils, obtained as in the Example 1, were treated in a filter press (r"), as shown in FIG. 5. Each oil 8 was treated separately with concentrate 11 obtained from the vegetation water of the same olives. Then, 500 ml concentrate 11 were pumped from storage reservoir (k) to the filtration units arranged in the filter press (r"). Afterwards, 20 litres of extra virgin olive oil 8 were caused to pass through the filtering units, in which concentrate 11 had been previously arranged.

Figure 9:
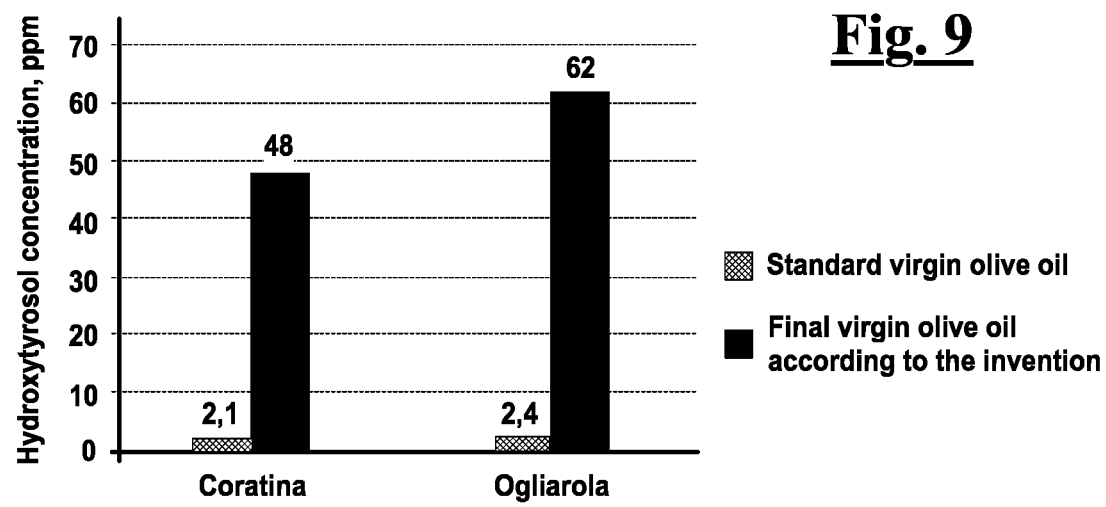

The oil travelling along the filter press was recirculated for a maximum time of 10 minutes. After the first 3 minutes, and at every subsequent minute, oil samples were taken and analysed by the same method as in Example 1. The amount of total polyphenols transferred achieved a maximum level already after the first 5 minutes and remained the same value until the $10^{th}$ minute. The results are shown in FIGS. 8 and 9. In the case of Coratina oil, the total polyphenol content changed from 560 to 650 ppm and hydroxytyrosol concentration changed from 2.1 to 48 ppm. For Ogliarola oil the total polyphenol content has passed by 280 to 380 ppm and hydroxytyrosol concentration from 2.4 to 62 ppm.

Example 3

Figure 10:
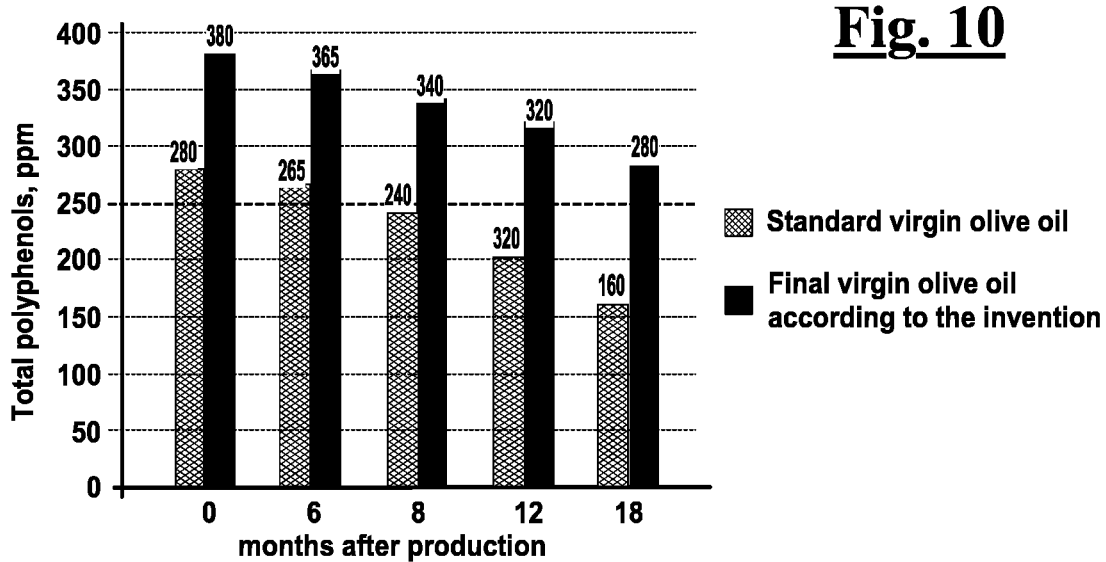
FIG. 10 is a diagram showing the polyphenol concentration change with time in an oil obtained by the method of the invention, compared with the base oil from which this oil is obtained.

Long-Lasting Presence of Polyphenols in Ogliarola Polyphenol-Rich Virgin Olive Oil and Permanence of the Requirements of EFSA Health Declaration Still after 18 Months Since the Production Standard Ogliarola extra virgin olive oil 8 and the corresponding high-polyphenol extra virgin oil 12 obtained in Example 2 were aliquoted in the volume of 100 ml into 20 opaque glass bottles for each oil, leaving as less air as possible in the bottleneck. All the bottles were maintained at a room temperature (cellar) ranging between 18° C. and 22° C., and were minimally exposed to the light. The total polyphenol concentration of the oil contained in three bottles was evaluated after 0, 6, 8, 12, 18 months, according to COI-HPLC method. From the results, shown in FIG. 10, it clearly appears that, whereas standard Ogliarola extra virgin oil did no longer meet the EFSA requirement (>250 ppm) about ten months after the production time, the corresponding high-polyphenol oil obtained by the process according to the present invention maintained this requirement (280 ppm) even 18 months after the production.

The foregoing description exemplary embodiments and specific examples of the invention will so fully reveal the invention according to the conceptual point of view, so that others, by applying current knowledge, will be able to modify and/or adapt such embodiments for various applications without further research and without parting from the invention, and, accordingly, it is to be understood that such adaptations and modifications will have to be considered as equivalent to the specific embodiment and to the examples. The means and the materials to perform the various functions described herein could have a different nature without, for this reason, departing from the scope of the invention. It is to be understood that the phraseology or terminology that is employed herein is for the purpose of description and not of limitation.

The invention claimed is:

1. A process for making an olive oil containing more than 300 ppm polyphenols and more than 10 ppm hydroxytyrosol, said process comprising the steps of:
   prearranging an amount of olives to be treated;
   transforming said olives into an oily must;
   resolving said oily must into:
   an oily juice;
   an aqueous juice, said aqueous juice containing polyphenols;
   preparing a base olive oil from said oily juice;
   separating vegetation water from said aqueous juice,
   removing water from said vegetation water obtaining a polyphenol-enriched concentrate;
   discontinuing said step of removing water when said vegetation water while turning into said concentrate achieves a predetermined viscosity and/or density; and
   mixing said base olive oil with said concentrate in order to cause a transfer of said polyphenols from said concentrate into said base olive oil obtaining a polyphenol-enriched final oil as well as an exhausted concentrate which is separated from said polyphenol-enriched final oil.

2. The process according to claim 1, wherein said concentrate has a polyphenol concentration higher than 2.5%.

3. The process according to claim 1, wherein said concentrate has a polyphenol concentration lower than 15%.

4. The process according to claim 1, wherein said concentrate has a total solute concentration set between 40% and 65% w/w.

5. The process according to claim 1, wherein said step of mixing said base olive oil with said concentrate comprises a step of conveying said base olive oil and of said concentrate along a path with a restricted flow section.

6. The process according to claim 1, wherein said restricted flow section of said path is selected from the group consisting of:
   a peripheral section of a container, said peripheral section defined by a wall of said container and by a piston translating within said container;
   a flow section of a duct arranged outside of a container and in hydraulic connection between two end portions of said container, said step of conveying being performed by a pump having its own suction and delivery mouths arranged along said duct;
   a flow section of a duct arranged outside of a container and in hydraulic connection between a first chamber and a second chamber of said container, said first chamber and said second chamber defined in said container by a piston fluid-tightly slidingly arranged within said container;
a plurality of passage holes of at least one plate of a filter press, said filter press alternately fed with said concentrate and said base olive oil.

7. The process according to claim 4, wherein said solute concentration is selected in such a way that said composition has a density set between 1.20 and 1.35 g/cm$^3$ and a viscosity ranging between 400 and 800 mPa·s at a temperature ranging between 20° C. and 25° C.

8. The process according to claim 1, wherein said step of removing water comprises a step of vaporizing water.

9. The process according to claim 1, wherein said step of removing water comprises a step of reverse osmosis, wherein said concentrate is retained by a membrane and said water is removed by permeation through said membrane.

10. The process according to claim 1, wherein said step of removing water is preceded by a step of micro-filtering and/or nano-filtering said vegetation water.

11. The process according to claim 1, wherein said step of separating vegetation water from said aqueous juice comprises:
introducing said aqueous juice into a separator obtaining an olive paste containing residual polyphenols and said vegetation water;
conveying an amount of said vegetation water back to said separator in order to dilute said olive paste and assist the transfer of said residual polyphenols into said vegetation water,
wherein said separator is a vertical centrifugal separator.

12. An apparatus for making a polyphenol-enriched olive oil, comprising:
a device configured to obtain an oily must from olives;
a first separation equipment configured to resolve said oily must into:
an oily juice containing a base olive oil, and
an aqueous juice, said aqueous juice containing polyphenols;
a second separation equipment configured to separate a vegetation water from said aqueous juice,
a concentration equipment configured for receiving said vegetation water and for removing water from said vegetation water, in order to obtain a polyphenol-enriched concentrate;
a mixing equipment configured for mixing said base olive oil with said concentrate, so as to transfer said polyphenols from said concentrate into said base olive oil, and to obtain a polyphenol-enriched final oil, as well as the exhausted concentrate,
wherein said mixing equipment comprises a path with a restricted flow section, and is configured for conveying said base olive oil and said concentrate through said restricted flow section of said path.

13. The apparatus according to claim 12, wherein:
said mixing equipment comprises a container arranged for receiving said base olive oil and said concentrate;
said mixing equipment is configured for conveying said base olive oil and said concentrate together through said restricted flow section of said path,
and wherein said restricted flow section of said path is selected from the group consisting of:
a peripheral section of said container defined by a wall of said container and by a piston translating within said container;
a flow section of a duct arranged outside of said container and in hydraulic connection between two end portions of said container, wherein a pump has its own suction and delivery mouths arranged along said duct;
a flow section of a duct arranged outside of said container and in hydraulic connection between a first chamber and a second chamber of said container, said first chamber and said second chamber defined in said container by a piston fluid-tightly slidingly arranged within said container.

14. The apparatus according to claim 12, wherein said mixing equipment comprises a filter press, said filter press comprising at least one plate having a plurality of holes, and having a feed means for alternately feeding said concentrate and said base olive oil, so as to force them to flow through said holes.

15. The apparatus according to claim 13, wherein said restricted flow section comprises said peripheral section of said container defined by said wall and by said piston, and said mixing equipment comprises a gas delivery/spread means configured for causing an inert gas to bubble with respect to said base olive oil in a bottom portion of said container.

16. The apparatus according to claim 12, wherein said concentration equipment comprises at least one evaporation unit, wherein said evaporation unit is configured to operate at a reduced pressure.

17. The apparatus according to claim 12, wherein said concentration equipment comprises an osmosis device configured to carry out a reverse osmosis of said vegetation water.

18. The apparatus according to claim 12, comprising a micro-filtration unit and/or a nano-filtration unit upstream of said concentration equipment.

19. A process for making a composition for use in food, food oils, dietary supplements for human and animal use, cosmetics, bio-repellents, and medicaments for treating skin diseases, comprising the steps of:
prearranging an amount of olives to be treated;
transforming said olives into an oily must;
resolving said oily must into:
an oily juice, from which a base olive oil is obtained, and
an aqueous juice;
preparing a base olive oil from said oily juice;
separating vegetation water from said aqueous juice, wherein said step of separating is carried out in a vertical centrifugal separator,
removing water from a vegetation water in such a way that said composition is obtained in the form of a concentrate comprising a solute amount set between 40% and 65% w/w; water; and between 2.5% and 15% w/w of total polyphenols included in said solute amount;
discontinuing said step of removing water when said vegetation water while turning into said concentrate achieves a predetermined viscosity and/or density.

20. The process according to claim 19, wherein, before said step of removing water, a step is provided of micro-filtering and/or nano-filtering said vegetation water, and, in said separation step, said aqueous juice is diluted with an amount of said vegetation water drawn as the permeate downstream of said step of micro-filtering and/or nano-filtering.

21. A composition for use in food, food oils, dietary supplements for human and animal use, cosmetics, bio-repellents, and medicaments for treating skin diseases, wherein said composition is obtained by the process of claim 19 and in that it comprises:

a solute amount set between 40% and 65% w/w;
water,
wherein said composition comprises between 2.5% and 15% w/w of total polyphenols included in said solute concentration.

22. The composition according to claim 21, wherein said solute concentration is selected in such a way that said composition has a density set between 1.20 and 1.35 g/cm$^3$ and a viscosity set between 400 and 800 mPa s at a temperature set between 20° C. and 25° C.

23. The composition according to claim 21, wherein at least 30% of said total polyphenols is hydroxytyrosol.

24. The method according to claim 1, wherein said olive oil contains between 300 and 700 ppm polyphenols.

25. The method according to claim 1, wherein said olive oil contains between 40 and 120 ppm hydroxytyrosol.

* * * * *